United States Patent

Germanton et al.

[11] Patent Number: 5,886,302
[45] Date of Patent: Mar. 23, 1999

[54] ELECTRICAL WEIGHING SCALE

[75] Inventors: Damon Germanton, Kennalon, N.J.;
Mark W. Cappiello, New York, N.Y.;
Richard E. Tasker, San Jose, Calif.;
Steven P. Petrucelli, Cranbury, N.J.

[73] Assignee: Measurement Specialties, Inc., Fairfield, N.J.

[21] Appl. No.: 968,918

[22] Filed: Nov. 6, 1997

Related U.S. Application Data

[63] Continuation of Ser. No. 385,349, Feb. 8, 1995, abandoned.

[51] Int. Cl.⁶ .............................. G01G 19/00; G01G 3/14; H01B 7/00
[52] U.S. Cl. ...................... 177/199; 177/210 R; 177/211; 174/135
[58] Field of Search ................................. 174/66, 67, 50, 174/135; 177/154, 155, 157, 199, 200, 210 R, 211, 229; 73/862.632, 862.634, 862.635

[56] References Cited

U.S. PATENT DOCUMENTS

| | | | |
|---|---|---|---|
| 3,266,584 | 8/1966 | Lee | 177/136 |
| 3,910,366 | 10/1975 | Teraillon | 177/225 |
| 4,082,154 | 4/1978 | Pillote | 177/211 |
| 4,355,692 | 10/1982 | Ostrelich | 177/211 |
| 4,363,368 | 12/1982 | Paddon et al. | 177/144 |
| 4,380,175 | 4/1983 | Griffen | 177/211 X |
| 4,381,826 | 5/1983 | Kupper | 177/211 |
| 4,411,326 | 10/1983 | Siegel | 177/211 |
| 4,433,741 | 2/1984 | Ryckman, Jr. | 177/199 |
| 4,467,661 | 8/1984 | Somal | 177/229 X |
| 4,541,496 | 9/1985 | Layer | 177/211 |
| 4,548,086 | 10/1985 | Kastel | 73/862.632 |
| 4,556,115 | 12/1985 | Lockery et al. | 177/211 |
| 4,558,757 | 12/1985 | Mori et al. | 177/211 X |
| 4,572,309 | 2/1986 | Nishiyama | 177/50 |
| 4,739,848 | 4/1988 | Tulloch | 177/199 |
| 4,785,896 | 11/1988 | Jacobson | 177/211 |
| 4,800,973 | 1/1989 | Angel | 177/211 |
| 4,819,750 | 4/1989 | Carnevale | 177/256 |
| 4,844,189 | 7/1989 | Shisgal et al. | 177/211 |
| 4,848,493 | 7/1989 | Hitchcock | 177/211 |
| 4,866,133 | 9/1989 | Horn et al. | 177/211 |
| 4,867,259 | 9/1989 | Yung | 177/211 |
| 4,880,069 | 11/1989 | Bradley | 177/211 |
| 4,893,685 | 1/1990 | Bergman et al. | 177/174 |
| 4,898,255 | 2/1990 | Gaines | 177/211 |
| 4,910,362 | 3/1990 | Kinner | 174/135 |
| 4,949,799 | 8/1990 | Wernimont | 177/211 |
| 4,951,765 | 8/1990 | Naito et al. | 177/211 |
| 4,958,526 | 9/1990 | Haggstrom | 73/862.67 |
| 4,979,580 | 12/1990 | Lockery | 177/211 |
| 4,979,581 | 12/1990 | Kroll | 177/211 |
| 4,988,831 | 1/1991 | Wilson et al. | 174/135 |
| 4,993,506 | 2/1991 | Angel | 177/211 |
| 5,006,960 | 4/1991 | Kallin et al. | 174/135 |
| 5,189,256 | 2/1993 | Epple | 174/50 |
| 5,296,655 | 3/1994 | Sargent et al. | 177/199 |

FOREIGN PATENT DOCUMENTS

| 0132885 | 5/1990 | Japan | 174/66 |
|---|---|---|---|

*Primary Examiner*—Randy W. Gibson
*Attorney, Agent, or Firm*—Plevy & Associates

[57] ABSTRACT

An electrical weighing scale for measuring the weight of a user having has a substantially transparent platform, a plurality of supports, and a display assembly. Piezoresistive sensors, disposed in the supports, change resistance in response to a change in the weight applied to the scale. The piezoresistive sensors include piezoresistive elements arranged in a half bridge structure that has been calibrated to provide zero balance, span matching and impedance normalization. The sensors are coupled in parallel to a display. The parallel arrangements produces a composite output signal that enables any number of sensors to be used in the scales design.

19 Claims, 6 Drawing Sheets

ELECTRICAL WEIGHING SCALE

This is a continuation of application Ser. No. 08/385,349, filed on Feb. 8, 1995, now abandoned.

FIELD OF THE INVENTION

This invention relates generally to an electrical weighing scale, and more particularly to electrical weighing scales that use multiple disperse piezoresistive sensors to calculate weight of an object placed upon the scale.

BACKGROUND OF THE INVENTION

Many electrical weighing scales use electrical sensors that are coupled to amplifiers and provide an electrical signal indicative of a weight applied to the scale. In particular, many prior art approaches use a Wheatstone bridge arrangement of resistive sensors coupled to an amplifier. Such prior art scales are exemplified by, U.S. Pat. No. 4,739,848, entitled SCALES, issued to Tulloch; U.S. Pat. No. 4,800,973, entitled, PORTABLE ELECTRONIC SCALE OF MINIMAL THICKNESS AND WEIGHT, issued to Angel; and U.S. Pat. No. 4,880,069,entitled ELECTRONIC BATHROOM SCALE, issued to Bradley.

Inaccurate readings in electrical weighing scales may result from poor sensor tolerances and other disparities among the individual sensors. For example, if two piezoresistive sensors used in the same scale have different no-load resistances a false weight may be calculated. To compensate for sensor variations, the prior art has employed parallel resistance circuits such as that as set forth in U.S. Pat. No. 4,800,973,issued to Angel, and resistive balancing circuits such as that set forth in U.S. Pat. No. 3,266,584,entitled VEHICLE WEIGHING SCALE WITH OVERLAPPED LOAD BEARING PLATES, issued to Lee.

The manufacturing costs of previous scales frequently include the expenses of purchasing amplifiers, mounting amplifiers, and testing amplifiers for the proper amplification and summing of sensor signals.

Weighing scales are often placed in bathrooms and other places where temperature and humidity change rapidly. The performance of weighing scales may therefore deteriorate because of exposure to environmental conditions such as moisture, or contaminants such as household cleaning agents. Exposure to moisture and contaminants may cause inaccurate weight measurements over time because the resistance of circuit traces and component leads may be changed by corrosion.

Variations in temperature are one of the most common causes of inaccurate readings from piezoresistive elements. Since few places in a domestic setting vary in temperature as much as a bathroom, bathroom scales using piezoresistive elements must somehow compensate for temperature variations. The prior art is replete with various circuits and other schemes that provide temperature compensation to piezoresistive elements. Such prior art is exemplified by U.S. Pat. No. 4,333,349 to Mallon et al, entitled BINARY BALANCING APPARATUS FOR SEMICONDUCTOR TRANSDUCER STRUCTURES and U.S. Pat. No. 4,192,005 to Kurtz, entitled COMPENSATED PRESSURE TRANSDUCER EMPLOYING DIGITAL PROCESSING TECHNIQUES.

It is therefore, an objective of the present invention to provide a scale that is highly reliable yet is economical to manufacture.

It is a further objective of the present invention to provide a scale that is compensated for changes in environmental variables, such as temperature.

It is a further object of the present invention to provide a scale that compensates for use variables, such as the distribution of weight upon the scale.

SUMMARY OF THE INVENTION

The present invention is a weighing scale that includes a rigid platform that rests upon a plurality of support assemblies. In each of the support assemblies is at least one sensor that measures the weight supported by that particular support assembly. The sensors are preferably piezoresistive elements that vary in resistance as the weight applied to the platform varies. The piezoresistive elements within the scale are temperature compensated to eliminate temperature created variations in the resistance values of the piezoresistive elements.

The piezoresistive elements in the various sensors are all joined in parallel. As such, any number of piezoresistive elements can be used in the weighing scale. A composite signal is gathered from the various piezoresistive elements connected in parallel. The composite signal is measured with respect to a reference to determine the total weight applied to the scale. Since a composite signal is gathered from all of the piezoresistive elements, the measured weight is accurate despite how a weight is distributed on the scale.

The various support assembles used to support the platform of the scale each include an upper plate, a lower plate and at least one flexible element. One end of the flexible element is coupled to the upper plate and the opposite end of the flexible element is coupled to the lower plate, wherein the flexible element retains the upper and lower plates a predetermined distance apart. As weight is applied to the scale, the upper and lower plates are biased together and the flexible element elastically bends. The piezoresistive elements are disposed on the flexible element and provide a changing resistive value proportional to the bending of the flexible element and the weight applied to the scale.

BRIEF DESCRIPTION OF THE DRAWINGS

Exemplary embodiments of the invention are illustrated in the following drawings.

DETAILED DESCRIPTION OF THE DRAWINGS

Although the present invention can be used in many different applications where a weight is to be measured, such as a food scale, a cargo scale or the like, the present invention is especially suitable for use in connection with a domestic weighing scale (i.e. a common bathroom scale). Accordingly, the present invention will be described in connection with a domestic weighing scale to set forth the best mode of the invention.

Figure 1:
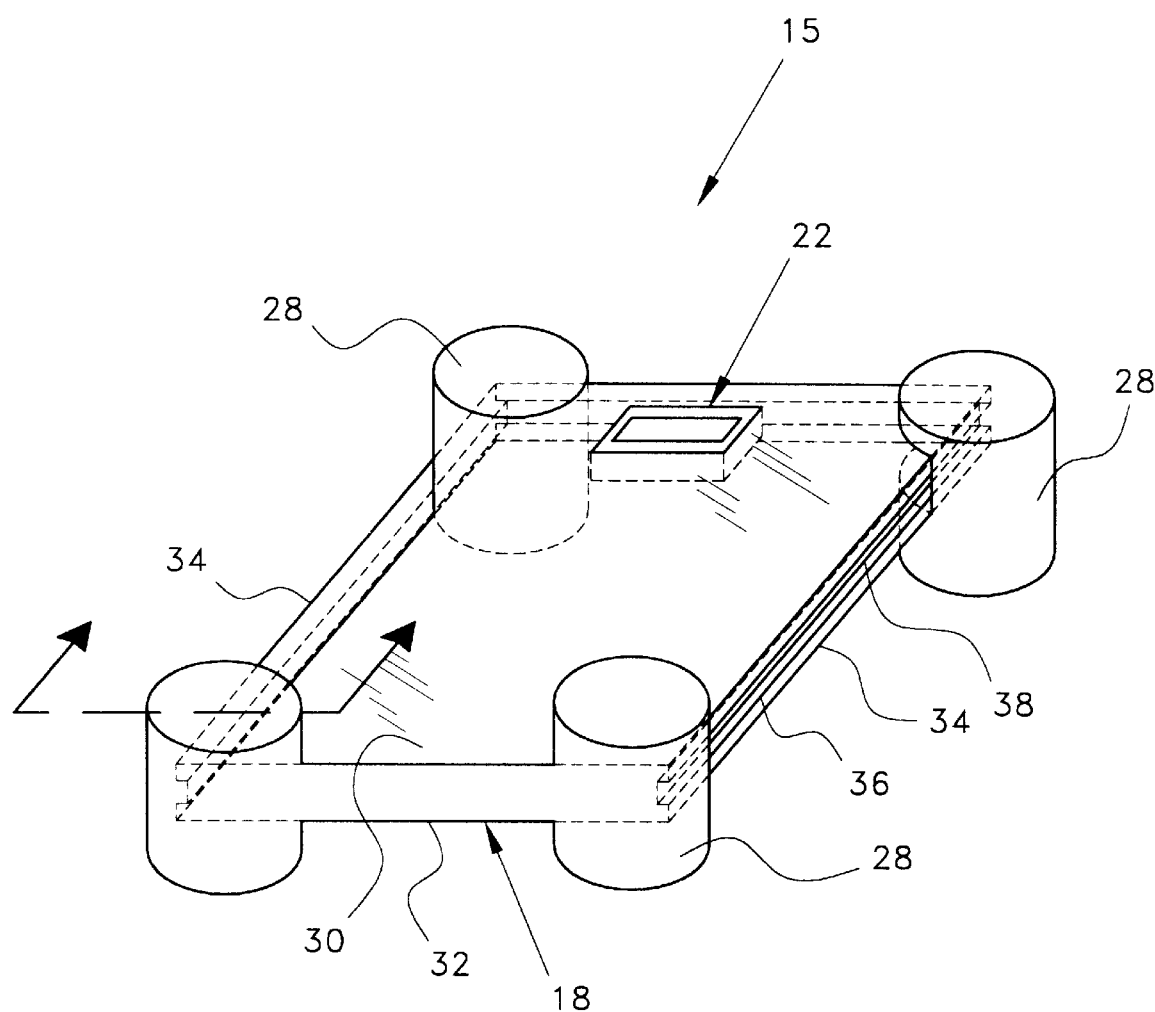
FIG. 1 is a perspective view of a preferred embodiment of the present invention electrical weighing scale.

Referring to FIG. 1, a preferred embodiment of the weighing scale 15 is shown having a transparent platform 18, supports 28, and a display assembly 22. The transparent platform 18 is elevated above the ground by the supports 28. Each support 28 contains a piezoresistive sensor that changes an electrical parameter (i.e. resistance) in response to at least one weight applied to the platform 18. The piezoresistive sensors are coupled to the display assembly 22 via conductors 38. In a preferred embodiment, the conductors 38 are routed in a channel 36 along the sides of 34 of the platform 18 to be inconspicuous.

The display assembly 22 provides a numerical indication of the weight applied to the platform 18. The display assembly 22 is preferably disposed on the bottom 32 of the platform 18 and is viewable through the transparent platform.

The platform 18 of the present invention is a substantially rectangular structure having a top surface 30, a bottom surface 32, and side surfaces 34. The platform 18 is preferably constructed of a transparent material such as clear plastic resin (i.e. methyl methacrylate), glass, or tempered glass. The top surface 30 and the bottom surface 32 are substantially flat. As earlier stated, the side surfaces 34 of the platform 18 define a channel 36, or a recess of a predetermined size to receive the conductors 38.

The channel 36 preferably extends along three sides of the platform 18. The channel 36 retains and routes the conductors 38 from the supports 28 to the display assembly 22. When the conductors 38 are routed in the channel 36, the conductors 38 and any associated electrical insulation appear like trim ornamenting the side surfaces 34. In addition, the channel 36 enhances the aesthetic appearance of the transparent platform 18 by eliminating protruding conductors, which could otherwise detract from the appearance of the weighing scale 15.

Alternate embodiments of the present invention weighing scale 15 may comprise a platform of a geometric shape other than rectangular. In addition, the top surface of the platform may optionally have corrugations or a rough surface to prevent a user from slipping. Alternate embodiments may position the display assembly within a mounting aperture in the platform or mount the display on the top surface of the platform. Although the platform 18, as shown in FIG. 1, has four supports 28, it is understood that the scale may contain any number of supports. For example, a scale with a substantially triangular platform may utilize three supports, one at each apex. Additionally, a scale with two large supports is possible where the surface area of the supports is sufficient to maintain stability of the platform.

Figure 2:
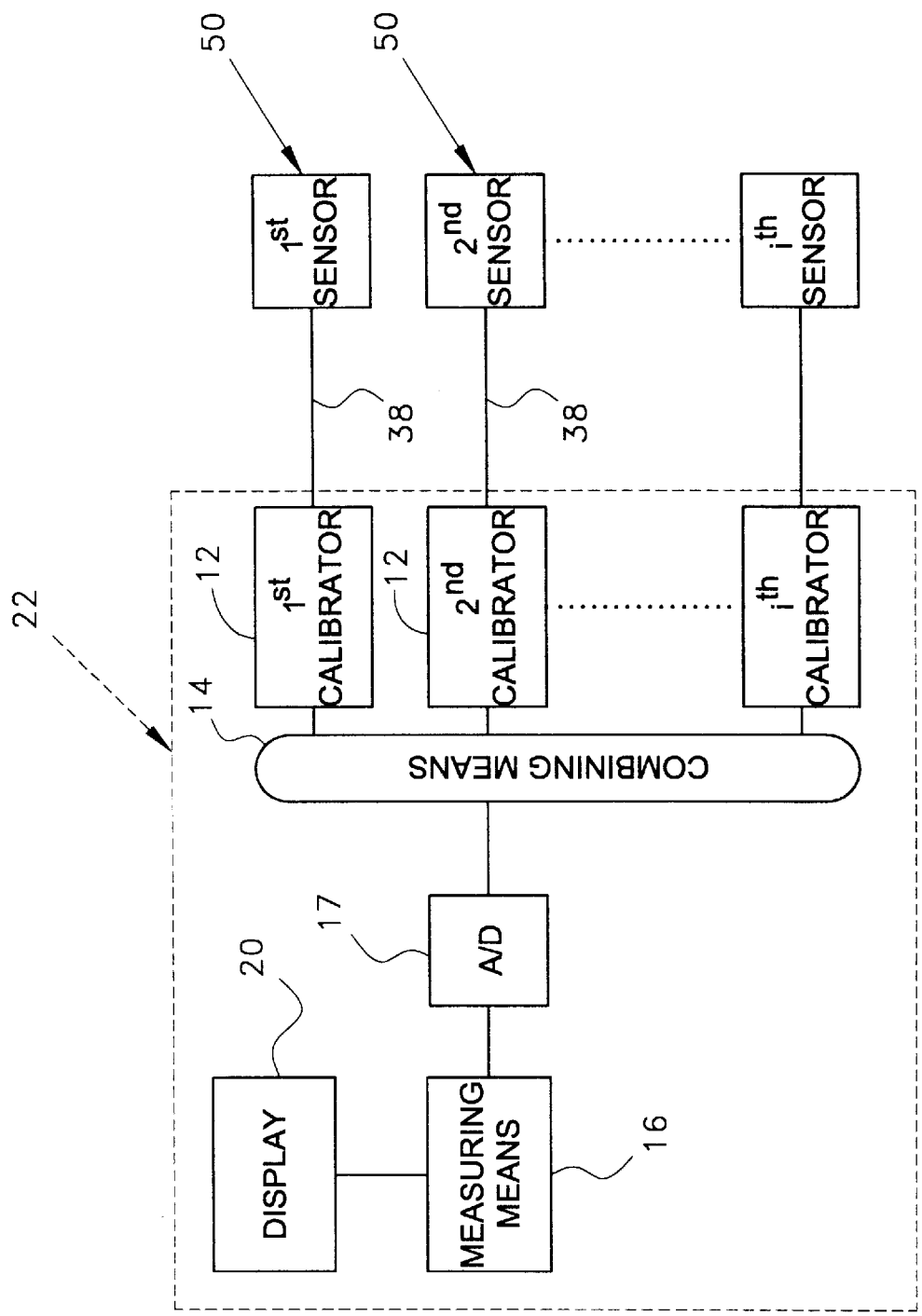
FIG. 2 is a block diagram of the circuitry contained within the present invention weighing scale.

Referring to FIG. 2 there is shown a block diagram of the electrical circuitry for a preferred embodiment of the present invention weighing scale. In each of the supports 18 (FIG. 1) is disposed at least one piezoresistive sensors 50. Each of the piezoresistive sensors 50 is an electrical device that varies in resistance in response to a weight applied to the various supports. Weight is applied to the various supports via the platform 18 (FIG. 1). In a preferred embodiment, each piezoresistive sensor 50 comprises a plurality of semiconductor strain gauges or other piezoresistive elements. The piezoresistive sensors 50 are coupled in parallel such that virtually any number of piezoresistive sensors 50 may be used in the electrical weighing scale. The parallel arrangement of the piezoresistive sensors 50 enables any number of sensors to be used within the scale with only a single combiner, as will later be explained.

The display assembly 22 contains the various electronics needed to convert the sensor signals into a numerical display indicative of weight. The display assembly 22 includes a plurality of calibrating circuits 12, a combining junction 14, an analog-to-digital converter (A/D) 17, a measuring means 16, and a display 20. The calibrating circuits 12 individually calibrate corresponding piezoresistive sensors 50 providing offset compensation, span matching and impedance normalization, as will later be explained. Each piezoresistive sensor 50 is coupled to a corresponding calibrating circuit 12 via conductors 38. The calibrating circuits 12 enable the piezoresistive sensors 50 to provide a response that reflects an accurate proportional share of the total weight applied to the platform regardless of ambient changes in temperature. Respective ones of the calibrating circuits 12 are associated with corresponding ones of the piezoresistive sensors 50 such that the electrical parameters of each piezoresistive sensor 50 may be adjusted individually. In a preferred embodiment, the calibrators 12 are entirely passive devices.

The plurality of calibrating circuits 12 further allow the piezoresistive sensors 50 to be compensated for variances in the length, or resistance, of conductors 38, and variances in the mounting arrangements of individual piezoresistive sensors 50. For example, variances in the mounting arrangements that stress a particular piezoresistive sensor 50 may necessitate the addition of a calibrating resistance to that particular piezoresistive sensor 50 to obtain appropriate indications of an applied weight.

The combining junction 14 couples the various piezoresistive sensors 50 in parallel to the measuring means 16, via the analog-to-digital converter 17. The measuring means 16 includes the display drivers needed for the display 20. The display 20 displays characters or numerals which are large enough to be viewed by a typical user standing on the platform 18 (FIG. 1). The combining junction 14 couples the piezoresistive sensors 50 in parallel and provides a composite signal to the measuring means 16. If a biasing potential, such as a direct current reference source, is applied to the piezoresistive sensors 50, then each piezoresistive sensor 50 produces a corresponding sensor signal in response to a weight applied to the platform. The magnitude of the corresponding sensor signal is proportional to the weight applied to a particular piezoresistive sensor 50. The combining junction 14 combines the sensor signals to obtain an aggregate or composite sensor signal. The magnitude of the composite sensor signal is proportional to the applied weight on the entire platform 18 (FIG. 1).

The measuring means 16 is coupled to the combining junction 14 and provides a user with a numerical value indicative of the applied force or weight. The measuring means 22 includes the needed display drivers and may be combined with the analog-to-digital (A/D) converter 17 as a single integrated circuit. The analog input of the A/D converter 17 is coupled to the combining junction 14 and the digital output of the A/D converter 17 is coupled to the measuring means 16. The measuring means 16 provides appropriate current and voltage levels to illuminate the display 20. The display 20 is preferably a light emitting diode display, or a liquid crystal display. In other embodiments, the measuring means 16 may comprise active devices such as amplifiers, or operational amplifiers. The amplifiers would be coupled to a display comprising an analog gauge for measuring voltage or current.

Figure 3:
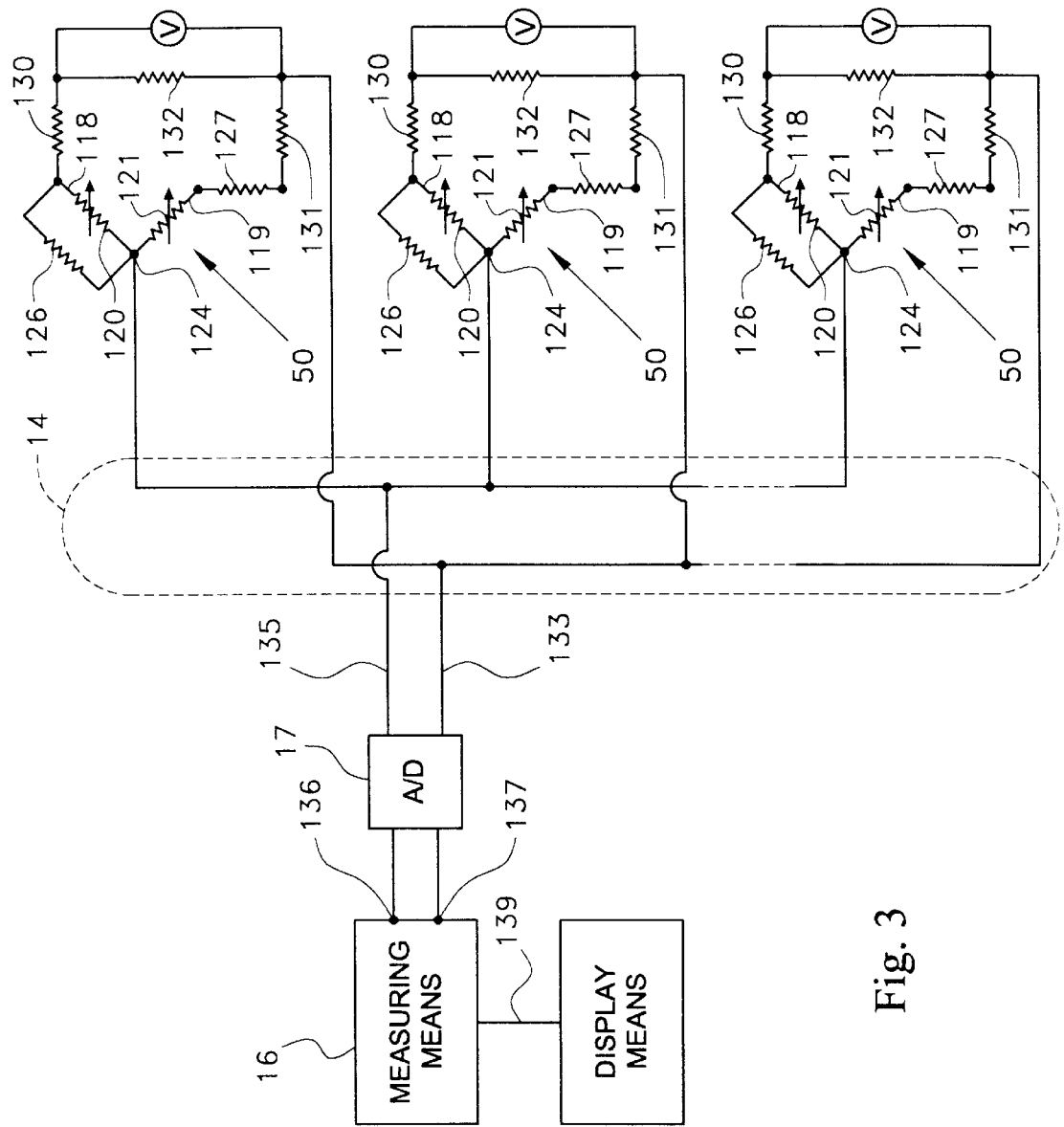
FIG. 3 is a schematic diagram showing the interconnections of the various piezoresistive sensors.

Each of the supports that elevate the platform above the ground contain at least one piezoresistive sensor 50. Referring to FIG. 3, it can be seen that each of the piezoresistive sensors 50 includes a half bridge structure having two arms 118, 119. Each arm in the half bridge structure includes at least one piezoresistive element which is a typical construction of a strain gauge. When manufacturing a half bridge structure with two piezoresistive elements 120, 121, it is practically impossible to find two piezoresistive elements that exactly match one other in a given application. This is due to manufacturing tolerances, mounting variables, lead conductor variables and the like. As is common practice for a half bridge strain gauge configuration, the piezoresistive elements 120, 121 are balanced to provide a zero balance at the center port 124. The zero balance at the center port 124 is created by balancing the resistive values of both arms 118, 119 in the half bridge structure. In the shown embodiment, a required zero balance is created by shunting the first piezoresistive element 120 with a compensating first resistor 126. Such shunt compensation is well known in the art of piezoresistive transducer structures. The value of the compensating resistor 126 is dependent upon the total resistive difference between the first and second arms 118, 119 in the half bridge structure, created by manufacturing tolerances, mounting variables, and lead conductor variables.

The presence of the compensating resistor 126 in the shunting configuration inherently increases current flow to the center port 124 of the half bridge structure via the first arm 118. To compensate for the current flow a second resistor 127 is added in series to the second arm 119 of the half bridge structure, thereby bringing the center port 124 to a zero balance for current flow. In the preferred embodiment, the output at the center port 124 is tested for zero balance at two temperatures (T1, T2), and at two loading conditions (L1, L2). By testing for zero balance at T1, T2, L1 and L2, quadratic equations are created that can be simultaneously solved to provide the needed compensating resistive values. The resistive values of the shunting resistor 126 and the second resistor 127 are selected so that the half bridge structure is zero balanced plus-or-minus an allowable error, at temperature T1 and T2 at a no-load condition.

Span matching is performed on the half bridge structure by providing the appropriately valued resistors 130, 131 in series with both the first and second arms 118, 119 of the half bridge structure. Lastly the impedance of the half bridge structure is normalized providing a resistor 132 between the leads that connect to the two arms 118, 119 of the half bridge structure. Span matching and impedance normalization for half bridge and full bridge structures are well known in the art. Any such known circuit may be used to provide the span matching and impedance normalization required. The shunting resistor 126, second resistor 127, span matching resistors 130, 131 and impedance normalization resistor 132 comprise the calibrating circuit 12 previously referenced in regard to FIG. 2.

The second arm 119 of each half bridge structure used in the scale is joined in parallel at the combining junction 14 to provide a first composite signal 133. The first composite signal 133 is then received by the measuring means 16, via the A/D converter 17. The center port 124 of each half bridge structure are also joined in parallel within the coupling junction 14, creating a second composite signal 135. The second composite signal 135 is also received by the measuring means 16, via the A/D converter 17.

The measuring means 16 has a first input 136 and a second input 137. The first input 136 receives the first composite signal 133 received from the parallel joined leads that couple the second arms 119 of the half bridge structure. The second input 137 of the measuring means 16 receives the second composite signal 135. Prior to the measuring means 16 the A/D converter 17 converts both the first composite signal 133 and the second composite signal 135 from analog signals to digital signals. The second composite signal 135 is then compared with the first composite signal 133 to produce a value that is indicative of the stresses being experienced by all of the various piezoresistive sensors 50. A display driver within the measuring means 16 receives the differential value and converts it into a display signal 139 that is used to drive the display assembly 22.

Since the display signal 139 received by the display assembly 22 is indicative of the strain measured by all of the piezoresistive sensors 50, the total strain measured is indicative of the total weight measured by the scale no matter how that weight is physically distributed on the scale.

The piezoresistive elements 120, 121 on the first and second arms 118, 119 of each of the piezoresistive sensors 50 are preferably set in the various supports so that they experience tension as weight is applied to the scale. As such, the various strain gauges preferably increase in resistance as they experience tension. However, other suitable mounting arrangements either in compression or tension can also be used.

Figure 4A:
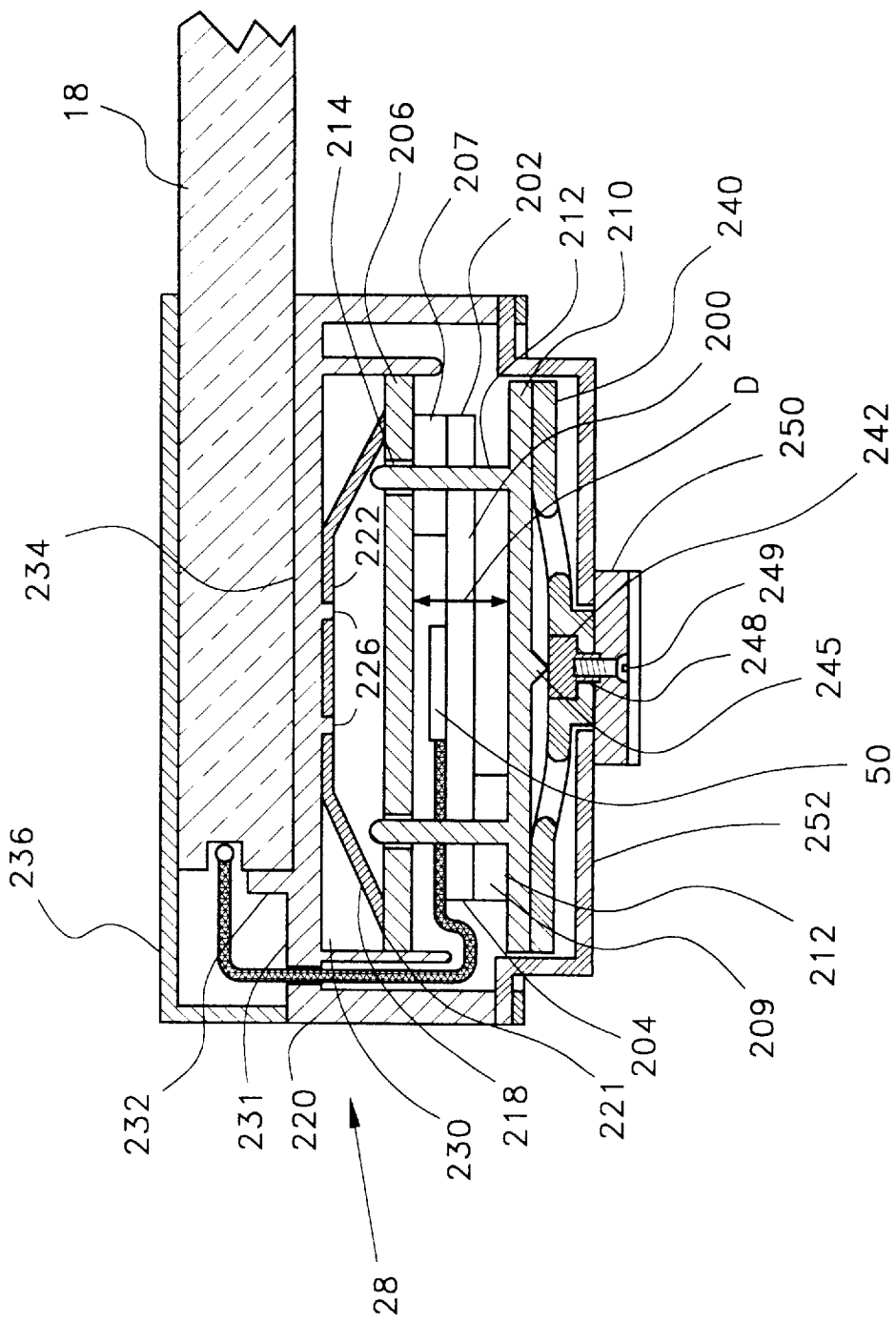
FIG. 4A is a cross-sectional view of a section of the embodiment shown in FIG. 1, viewed along section line 4—4.
Figure 4B:
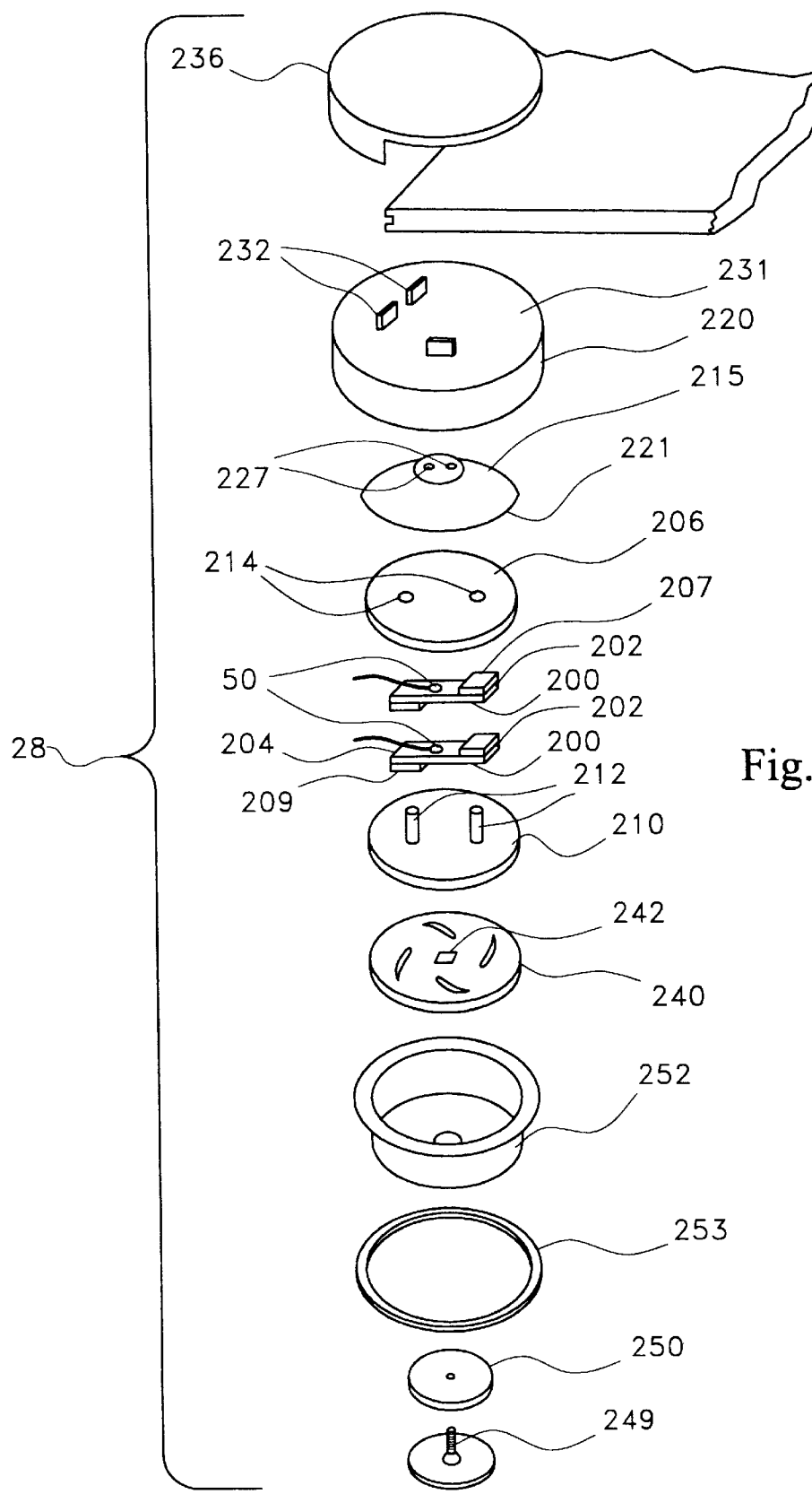
FIG. 4B is an exploded view of the support shown in cross-section in FIG. 4A.

Referring to FIG. 4A in conjunction with FIG. 4B, it can be seen that two piezoresistive sensors 50 are mounted within each of the supports 28. The piezoresistive sensors 50 are mounted in the center of two metal strips 200. The metal strips 200 have a spring constant value that enables the metal strips 200 to elastically deflect under the weight of person applied to the support 28. Each of metal strips 200 has a first end 202 and a second end 204. The first end 202 of each metal strip 200 is joined to an upper plate 206, wherein a first spacer 207 is juxtaposed between the upper plate 206 and the first end 202. The second end 204 of each metal strip 200 is joined to a lower plate 210, wherein a second spacer 209 is juxtaposed between the lower plate 210 and the second end 204. Since opposite ends of the metal strips 200 are joined to different plates, it will be understood that as the upper plate 206 and lower plate 210 are biased toward one another, the metal strips 200 are caused to bend in the area of the piezoresistive sensors 50. Two posts 212 extend upwardly from the lower plate 210. The two posts 212 extend upwardly through apertures 214 in the upper plate 206. The presence of the posts 212 from the lower plate 210 being present within the apertures 214 of the upper plate 206 prevents the upper and lower plates 206, 210 from moving laterally within respect to one another. Consequently, most all movement between the upper and lower plates 206, 210 is limited to vertical movements directly toward or away from one another. This prevents the upper and lower plates 206, 210 from twisting apart from one another when stressed.

A frustrum shaped spring element 218 rests upon the top surface 219 of the upper plate 206. The spring element 218 has a wide bottom rim 221 that engages the upper plate 206 at points near its periphery. The apex surface 222 of the spring element 218 is smaller than its bottom rim and engages the primary housing 220 of the support 28. Projections 226 extend from the primary housing 220 and engage apertures 227 in the spring element 218, thereby retaining the spring element 218 in place.

The primary housing 220 defines a recessed area 230 into which the spring element 218 and upper plate 206 pass. The top surface 231 of the primary housing 220 supports a corner of platform 18. Tabs 232 extend upwardly from the top surface 231 of the primary housing 220 to help align the platform 18 on the primary housing 220. In a preferred embodiment, adhesive 234 is disposed between the primary housing 220 and the platform 18 holding the platform 18 in place.

A cap member 236 extends across the top surface of the platform 18 in the area directly above the primary housing 220. The cap member 236 mechanically engages the primary housing 220 so as to give the aesthetically pleasing appearance that the cap member 236 is an integral part of the primary housing 220. The cap member 236 may also be adhesively coupled to the platform 18 to help retain both the cap member 236 and the platform 18 in place.

It will be understood that as a person steps onto the platform 18, the weight of the person experienced by the support 28 is transferred to the primary housing 220. The primary housing 220 does not rest upon the ground. As such, the weight is transferred to the upper plate 206 via the spring element 218. The upper plate 206, in turn, transfers the weight to the first end 202 of each of the metal strips 200 on which are placed the piezoresistive sensors 50. The second end 204 of each of the metal strips 200 is coupled to the lower plate 210.

A plastic spring element 240 is coupled to the bottom of the lower plate 210. A flat metal element 242 is disposed in the center of the plastic element 240.

A pointed projection 245 extends downwardly from the center of the lower plate 210. The plastic spring element 240 retains the flat element 242 directly below the pointed projection 245 wherein the plastic spring element 240 biases the flat metal element 242 against the pointed projection 245. A threaded aperture 248 is disposed in the bottom of the flat metal element 242 opposite the pointed projection 245. A screw 249 joins a footpad 250 to the plastic spring element 240. The footpad 250 rests upon the ground. As a result, when weight is applied to the footpad 250, the flat metal element 242 is pressed against the pointed projection 245. The pointed projection 245, being part of the lower plate 210, biases the lower plate 210 toward the upper plate 206. The lower plate 210, in turn, transfers the force of the second end 204 of each of the metal strips 200 upon which are disposed the piezoresistive sensors 50.

As weight is applied to the platform 18, the upper and lower plates 206, 210 are biased toward each other. This bias bends the metal strips 200 and reduces the distance D in between the upper and lower plates 206, 210. An elastomeric boot 252 covers the open bottom of the primary housing 220. The boot 252 allows the upper and lower plates 206, 210 to compress toward one another while protecting the metal strips 200 and the piezoresistive sensors 50 from corrosion. The boot 252 is held in place by a locking 253 that is mechanically attached to the primary housing 220.

Figure 5:
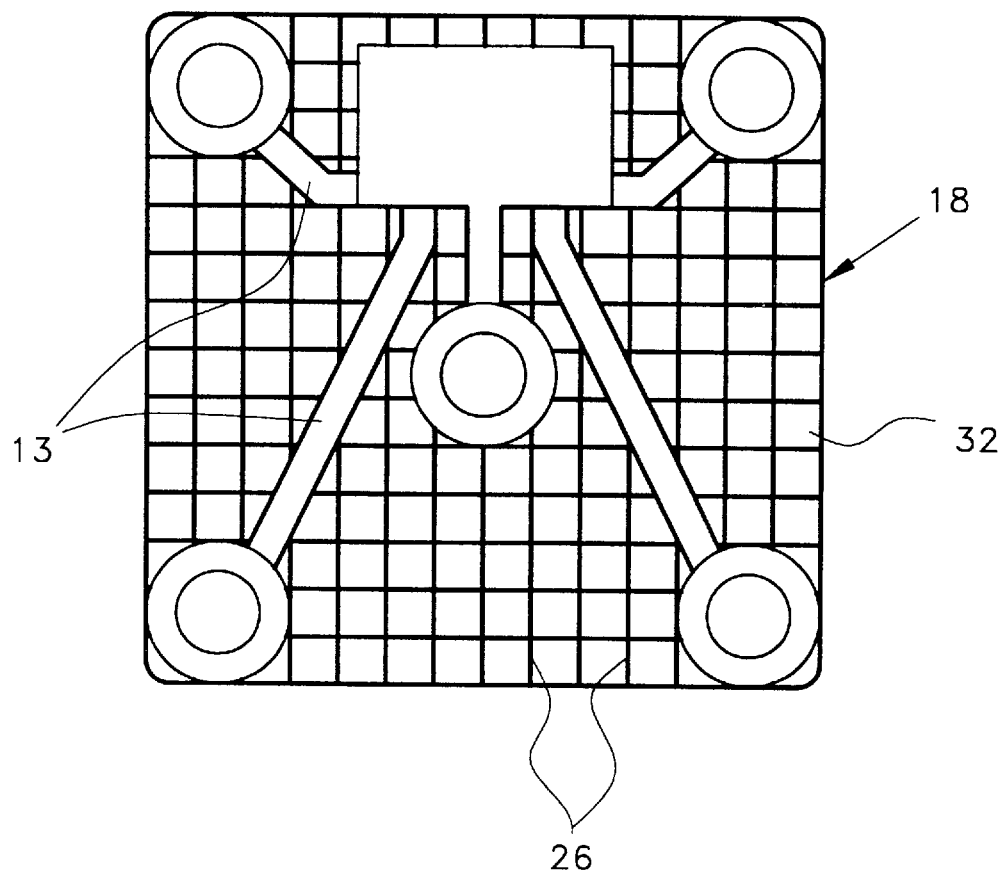
FIG. 5 illustrates a bottom view of an alternative embodiment of the weighing scale where the platform is constructed from an opaque material.

FIG. 5 illustrates an alternate embodiment of the bottom 32 of the platform 18 where the platform is construed of opaque materials such as plastic, fiberglass, polyvinyl, polyethylene, polyester, metal, or the like. If the platform 18 is construed from opaque plastic or analogous materials, then the bottom 32 preferably has ribs or joists 26 to impart structural rigidity to the platform 18. Alternate channels 13 are positioned diagonally about the bottom 32 of the platform 18 as illustrated in FIG. 5. The alternate channels 13 are used to route conductors from the sensors to other electrical components used in the electrical weighing scale.

The electrical weighing scale has a myriad of applications including use as a household weighing scale. The present invention has been described in connection with a highly specific exemplary embodiment. Nevertheless, many modifications and variations of the present invention will be readily apparent to those of ordinary skill in the art. Therefore, the scope of the following claims should not be unduly limited by the specific descriptions in the specification.

What is claims is:

1. A scale, comprising:
    a platform for receiving an applied weight, said platform being entirely transparent;
    a plurality of support assemblies, each of which receives a peripheral portion of said platform, each of said support assemblies receiving a percentage of the weight applied to said platform and including a half bridge sensor structure which generates an analog output signal which corresponds to the percentage of the weight received by each of said support assemblies;
    a display assembly coupled to said platform, said display assembly including combining means for combining said analog output signals in parallel to obtain a composite analog output sensor signal which is representative of the weight applied to said platform, and signal conversion means for converting said analog composite sensor signal to a composite digital signal; and
    wire means for electrically coupling said half-bridge sensor structures to said combining means of said display assembly, said wire means extending along an outer peripheral edge surface of said platform.

2. The scale according to claim 1, wherein said peripheral edge surface of said platform includes a channel that retains and routes said wire means from said support assemblies to said display assembly.

3. The scale according to claim 1, wherein said display assembly further includes display means for displaying a numerical value corresponding to said composite digital sensor signal.

4. The scale according to claim 1, wherein said display assembly further includes calibration means for individually adjusting electrical parameters of each of said half-bridge sensor structures.

5. The scale according to claim 4, wherein each of said half bridge sensor structures includes two arms, each of said arms comprising a piezoresistive element, and said calibrating means includes means for span matching said two arms of said half bridge sensor structure.

6. The scale according to claim 4, wherein said calibration means includes means for impedance normalizing said half bridge sensor structure.

7. The scale according to claim 1, wherein each of said support assemblies further includes an upper plate, a lower plate and a flexible element having a first and a second end, wherein said first end of said flexible element is coupled to said upper plate and said second end of said flexible element is coupled to said lower plate, wherein said flexible element retains said upper plate and said lower plate a predetermined distance apart, and said flexible element bends decreasing said predetermined distance as the weight is applied to said platform, an arm of said half bridge sensor structure being disposed on said flexible element.

8. A scale, comprising:
    a platform for receiving an applied weight;
    a plurality of support assemblies, each of which receives a peripheral portion of said platform, each of said support assemblies receiving a percentage of the weight applied to said platform and including a half bridge sensor structure which generates an analog output signal which corresponds to the percentage of the weight received by each of said support assemblies;
    a display assembly coupled to said platform, said display assembly including combining means for combining said analog output signals in parallel to obtain a composite analog output sensor signal which is representative of the weight applied to said platform, calibration means for enabling said half-bridge sensor structures to be individually electrically compensated, and signal conversion means for converting said analog composite sensor signal to a composite digital signal; and wire means for electrically coupling said half-bridge sensor structures to said combining means of said display assembly, said wire means extending along an outer peripheral edge surface of said platform.

9. The scale according to claim 8, wherein said platform is entirely transparent.

10. The scale according to claim 8, wherein said peripheral edge surface of said platform includes a channel that retains and routes said wire means from said support assemblies to said display assembly.

11. The scale according to claim 8, wherein said display assembly further includes display means for displaying a numerical value corresponding to said composite digital sensor signal.

12. The scale according to claim 8, wherein each of said half bridge sensor structures includes two arms, each of said arms comprising a piezoresistive element, and said calibrating means includes means for span matching said two arms of said half bridge sensor structure.

13. The scale according to claim 8, wherein said calibration means includes means for impedance normalizing said half bridge sensor structure.

14. A scale, comprising:

a platform for receiving an applied weight;

at least two support assemblies connected to said platform for receiving a percentage of said weight applied to said platform, each of said support assemblies comprising:
an upper plate;
a lower plate;
at least one flexible element disposed between said upper plate and said lower plate, said flexible element having a first end coupled to said upper plate and a second end coupled to said lower plate; and
at least one half bridge sensor structure with two arms, wherein each arm includes at least one piezoresistive element that varies in resistance and is disposed on said flexible element, wherein when said flexible element bends, said half bridge structure generates an analog output signal corresponding to the percentage of weight received by said support assemblies;

a display assembly coupled to said platform, comprising:
calibration means for enabling said piezoresistive elements of said half bridge sensor structure to be individually electrically compensated;
combining means for combining each analog output signal from said half bridge sensor structure in parallel to obtain a composite analog output sensor signal representative of the weight applied to said platform;
signal conversion means for converting said analog composite sensor signal to a composite digital signal; and
display means for displaying a value corresponding to said composite sensor signal; and
wire means for electrically coupling said half-bridge sensor structures to said combining means of said display assembly.

15. The scale according to claim 14, wherein said platform has a peripheral channel along the outer sides of said platform for receiving said wire means.

16. The scale according to claim 19, wherein said platform is transparent.

17. The scale according to claim 16, wherein said support assembly comprises:

an upper plate;

a lower plate;

a first and a second spacer;

two metal strips, each having a first end and a second end, said first end is coupled to said upper plate, wherein said first spacer is disposed therebetween, and said second end is coupled to said lower plate, wherein said second spacer is disposed therebetween;

a half bridge sensor structure mounted on each metal strip; and means for preventing lateral movement of said upper and lower plates.

18. The scale according to claim 16, wherein said calibration means includes means for span matching said two arms of said half bridge sensor structure.

19. The scale according to claim 18, wherein said calibration means includes means for impedance normalizing of said half bridge sensor structure.

* * * * *